(12) United States Patent
Philipp et al.

(10) Patent No.: US 11,639,986 B2
(45) Date of Patent: May 2, 2023

(54) OPTICAL DEVICE FOR A DISTANCE MEASUREMENT DEVICE ACCORDING TO THE LIDAR PRINCIPLE

(71) Applicant: Hella GmbH & Co. KGaA, Lippstadt (DE)

(72) Inventors: Dietmar Philipp, Erwitte (DE); Christian Boehlau, Rietberg (DE); Hans-Arne Driescher, Berlin (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 425 days.

(21) Appl. No.: 16/754,554

(22) PCT Filed: Oct. 2, 2018

(86) PCT No.: PCT/EP2018/076759
§ 371 (c)(1),
(2) Date: Apr. 8, 2020

(87) PCT Pub. No.: WO2019/072633
PCT Pub. Date: Apr. 18, 2019

(65) Prior Publication Data
US 2020/0256959 A1    Aug. 13, 2020

(30) Foreign Application Priority Data
Oct. 10, 2017  (DE) ...................... 10 2017 123 462.4

(51) Int. Cl.
*G01S 7/481* (2006.01)
*G01S 17/931* (2020.01)
*G01S 7/484* (2006.01)
*G01S 17/10* (2020.01)

(52) U.S. Cl.
CPC ............ *G01S 7/4814* (2013.01); *G01S 7/484* (2013.01); *G01S 7/4817* (2013.01); *G01S 17/10* (2013.01); *G01S 17/931* (2020.01)

(58) Field of Classification Search
CPC ...... G01S 7/4814; G01S 7/4817; G01S 7/484; G01S 17/10; G01S 17/931; G01S 17/32
See application file for complete search history.

(56) References Cited

U.S. PATENT DOCUMENTS 9,285,477 B1     3/2016 Smith et al.
10,996,322 B2 *  5/2021 Buettner ............... G01S 17/931
2018/0267148 A1 * 9/2018 Buettner ................. G01S 17/42

FOREIGN PATENT DOCUMENTS

DE      102015217908 A1    3/2017

* cited by examiner

*Primary Examiner* — Jonathan M Hansen
(74) *Attorney, Agent, or Firm* — Husch Blackwell LLP

(57) ABSTRACT

An optical device is provided for a distance measurement device according to the LIDAR principle. At least one light source is provided, along with a first means of deflection that during operation of the device deflects light emitted by the at least one light source into a first angle range. A second means of deflection is also provided that during operation of the device deflects the light emitted from the first means of deflection into a second angle range which is larger than the first angle range. Finally, an optical means is provided that influences the light in such a way that it hits the second means of deflection as convergent light.

10 Claims, 3 Drawing Sheets

Fig. 1
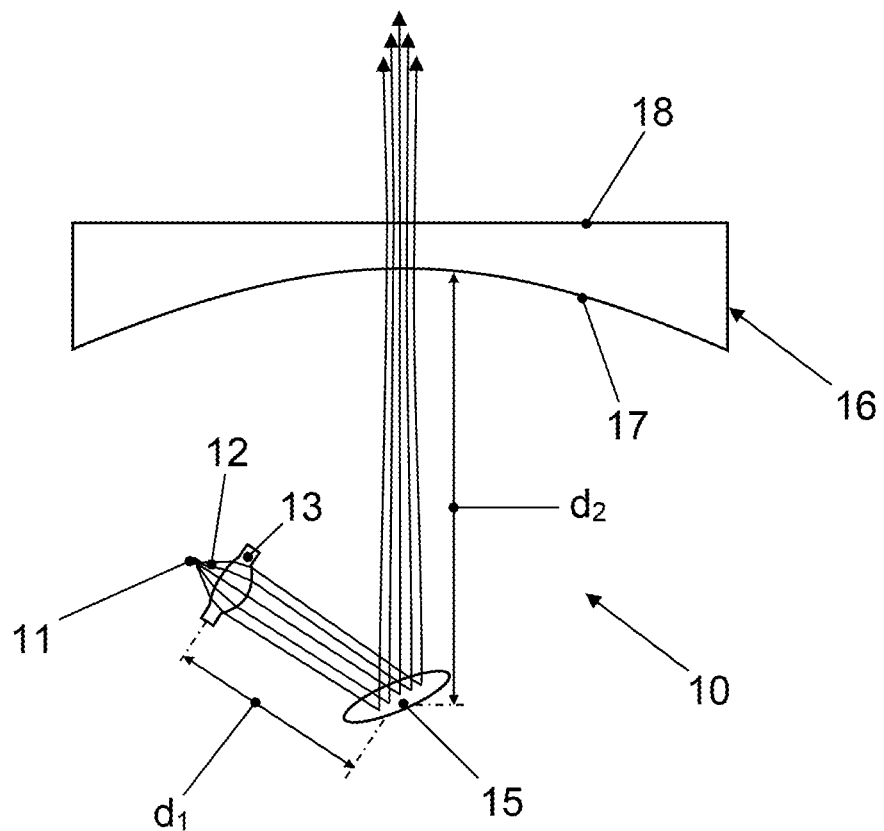
Fig. 2
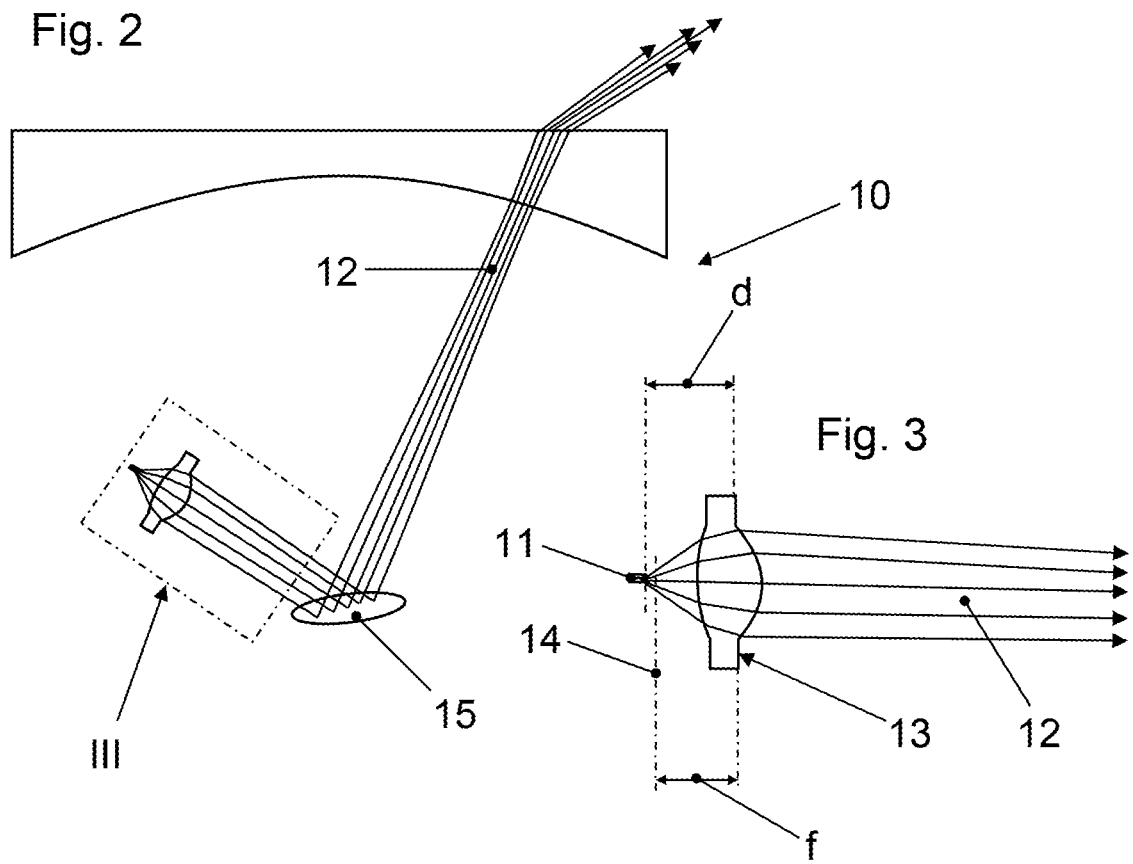
Fig. 3

OPTICAL DEVICE FOR A DISTANCE MEASUREMENT DEVICE ACCORDING TO THE LIDAR PRINCIPLE

CROSS REFERENCE

This application claims priority to PCT Application No. PCT/EP2018/076759, filed Oct. 2, 2018, which itself claims priority to German Application No. 10 2017 123462.4, filed Oct. 10, 2017, the entirety of both of which are hereby incorporated by reference.

FIELD OF THE INVENTION

The present invention relates to an optical device for a distance measurement device according to the LIDAR principle, and a distance measurement device according to the LIDAR principle.

BACKGROUND

Distance measurement device of the aforementioned kind working according to the LIDAR principle can, for example, be deployed in a motor vehicle for autonomous driving and accident prevention. Alongside coverage of a wide horizontal field of view (hFOV), the quality of the object resolution is of great importance in this context.

A device and a distance measurement device of the kind described at the beginning are known from U.S. Pat No. 9,285,477 B1. The device described therein uses as its light source a pulsed infrared later where the laser light is collimated. The collimated laser beam hits an oscillating MEMS mirror acting as a first means of deflection which deflects the laser light into a first angle area onto a refractive secondary lens. The secondary lens features a cylindrical entry surface and a flat exit surface. From the secondary lens, the laser light is deflected into a second angle range that is larger than the first angle range such that the horizontal field of view is enlarged.

A disadvantageous aspect of such devices becomes apparent in that the widening of the field of view by comparable secondary lenses is generally associated with a deterioration in the object resolution. FIG. 5 to FIG. 7 illustrate the conditions of such a design.

The device illustrated therein comprises a light source 1, for instance a laser light source with a primary optic 2 that collimates the light 3 exiting the laser light source. An oscillating mirror 4 deflects the light 3 into an angle range that can be, for example, 60° in size. The deflected light 3 hits a refractive secondary lens 5 that features a cylindrical entry surface 6 and a flat exit surface 7. The light 3 exits the secondary lens 5 as comparatively strongly divergent beam (see FIG. 5 and FIG. 6) so that the beam width 8 of individual partial beams 9 of the light in the distant field is relatively large (for this, see FIG. 7). This results in a correspondingly poor object resolution of the distance measurement device. In the prior art, this is partially compensated for by high-resolution elements on the receiver side, for example in the form a high-resolution 2D array with an upstream lens system suitable for distance measurement systems. Such systems are complex and are correspondingly high priced.

SUMMARY OF THE INVENTION

The problem underlying the present invention is the creation of a device of the kind described at the beginning that features a relatively small beam expansion in the distant field despite a large angle range into which the light is deflected. The present invention is further based on the problem of creating a distance measurement device of the kind described at the beginning that features relatively good object resolution despite a large horizontal field of view.

In accordance with the invention, this is achieved by a device of a kind described at the beginning with the characteristic features of claim 1 and by a distance measurement device of the kind described at the beginning with the characteristic features of claim 9. The subclaims related to preferred embodiments of the invention.

In accordance with claim 1 it is intended for the device to comprise an optical means that influences the light in such a way that it hits the second means of deflection as convergent light. If the convergence has the corresponding characteristics, it is possible to avoid to a great extent the divergence of the light exiting the second means of deflection such that a minor beam divergence arises and thus a small beam expansion at a distance from the device that, when used in a distance measuring device, typically corresponds to the objects to be detected. This results in good object resolution so that the high-resolution elements on the receiver side, known from the prior art, are no longer required.

There is the possibility for the optical means to take the form of a primary optic or part of a primary optic through which the light emitted by the at least one light source at least partially passes through prior to hitting the first means of deflection or which reflects at least partially the light emitted by the at least one light source onto the first means of deflection, where the primary optic features in particular a positive refractive power with a focal distance. For example, the primary optic can take the form of a convex lens or comprise a convex lens. In particular, the at least one light source may feature an exit aperture that features such a distance to the focusing plane of the primary optic that the light hits the second means of deflection as convergent light. In this way, simple means can be used to achieve the small beam expansion in the distant field desired in accordance with the invention.

Provision can be made for the first means of deflection to be formed as a movable mirror, in particular one oscillating around a rotary axis, where the mirror is preferentially an MEMS mirror. In particular, the mirror can feature a reflecting surface with a diameter between 1 mm and 5 mm. With such a mirror, it is possible to move a light beam very effectively over an angle range of up to around 60°.

There is the option the second means of deflection being formed as a secondary ens or comprising a secondary lens, where the secondary lens features a curved refractive surface, in particular a cylindrical lens or a curved refractive surface, in particular a cylindrical mirror. In this context, the cylindrical axis of the cylindrical lens or the cylindrical mirror can be essentially in parallel to the rotary axis of the mirror. Such a design makes it possible to enlarge, double for instance, the angle range into which the light is deflected so that it is possible to implement a large horizontal field of view when using a distance measurement device. For this purpose, a continuous curve of the refractive or reflective surface is advantageous because a continuously curved shape ensures stepless deflection.

It is quite possible for the curved refractive surface or the curved reflecting surface of the secondary optic to feature curves in relation to two orientations vertical to each other. In this way, it is possible for the curved refractive surface or the curved reflecting surface of the secondary optic to enlarge the angle range into which the light is deflected not only in a horizontal orientation but also influence the light in a vertical orientation, in particular shape the light in a vertical orientation.

Furthermore, there is the possibility for the secondary optic to feature an entry surface and an exit surface for the light that are both curved and where the entry surface features a different curve from the curve of the exit surface. For example, the curve of the entry surface can deflect, influence or shape the light in a horizontal orientation when in the installation position in the motor vehicle, whereas the curve of the exit surface can deflect, influence or shape the light in a vertical orientation when in the installation position. In particular, the entry surface and the exit surface each feature a cylindrical lens the cylindrical axes of which are aligned vertically to each other. There is, however, also the option for both the entry surface and also the exit surfaces to feature curves in relation to two orientations vertical to each other such that, in the installation position in a motor vehicle, the light is deflected, influenced or shaped by both surfaces not only in a horizonal orientation but also in a vertical orientation.

Provision can be made for the secondary optic to have more than one component. In this respect two or more components can feature a curved refractive surface, in particular a cylindrical lens or a curved refractive surface, in particular a cylindrical mirror. In this way, more than one component is able to contribute to the deflection in the second angle range so that the second angle range in particular can be enlarged.

Provision can be made that that the total of the distance from the primary optic to the first means of deflection and the distance from the first means of deflection to the second means of deflection is greater than the focal distance of the primary optic, in particular is larger by a factor of 5 to 50 larger than the focal distance of the primary optic. With distance ratios of such a kind it is possible to relatively effectively ensure a suitable convergence of the light hitting the second means of deflection.

In accordance with claim 9, it is provided for the distance measurement device to comprise a device in accordance with the invention.

By using a device in accordance with the invention, a laser beam shaped into a bundle which is as parallel and narrow as possible can be pivoted in the horizontal field of interest such so that a good object resolution is achieved.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a schematic top view of an embodiment of a device in accordance with the invention where the light exits the device in a first orientation;

FIG. 2 is a schematic top view of the embodiment in accordance with FIG. 1 where the light exits the device in a second orientation.

FIG. 3 is a detail in accordance with arrow III in FIG. 2.

DETAILED DESCRIPTION OF THE DRAWINGS

Figure 4:
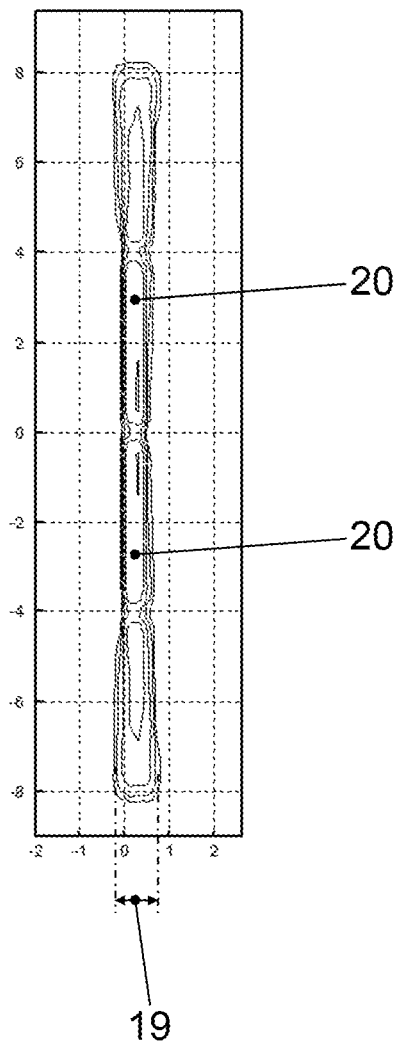
FIG. 4 is a diagram that illustrates the beam cross-section of the light in the distant field on exiting the embodiment in accordance with FIG. 1.
Figure 7:
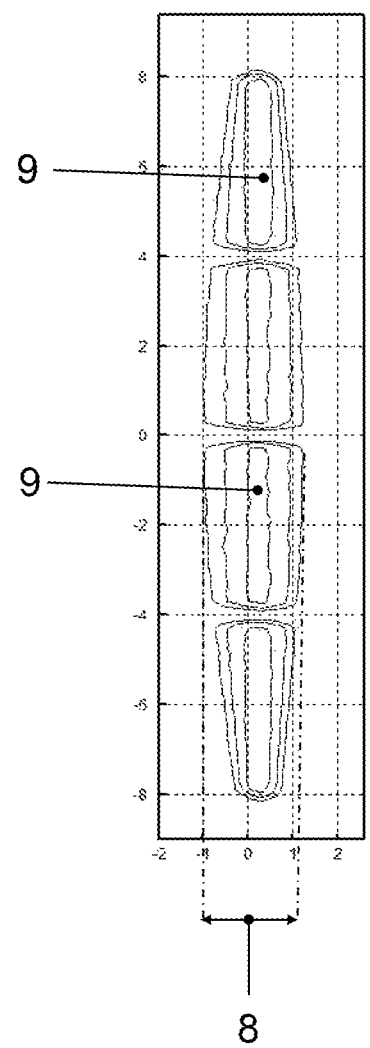
FIG. 7 is a diagram that illustrates the beam cross-section of the light in the distant field on exiting the embodiment in accordance with FIG. 4.
Figure 5:
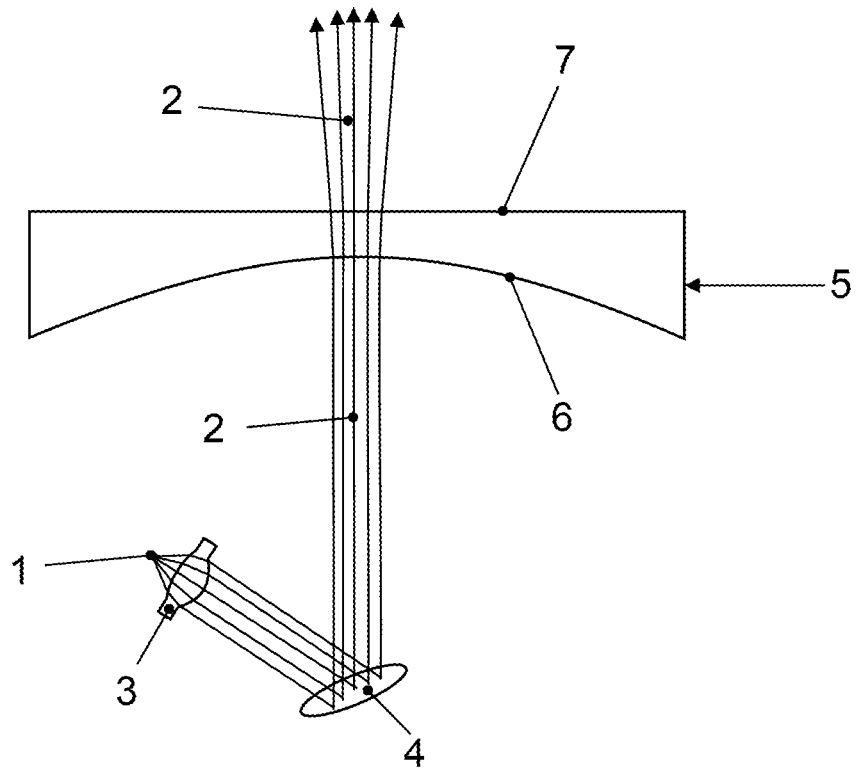
FIG. 5 is a schematic top view of an embodiment of a device according to the state of the art in which the light exits the device in a first orientation.
Figure 6:
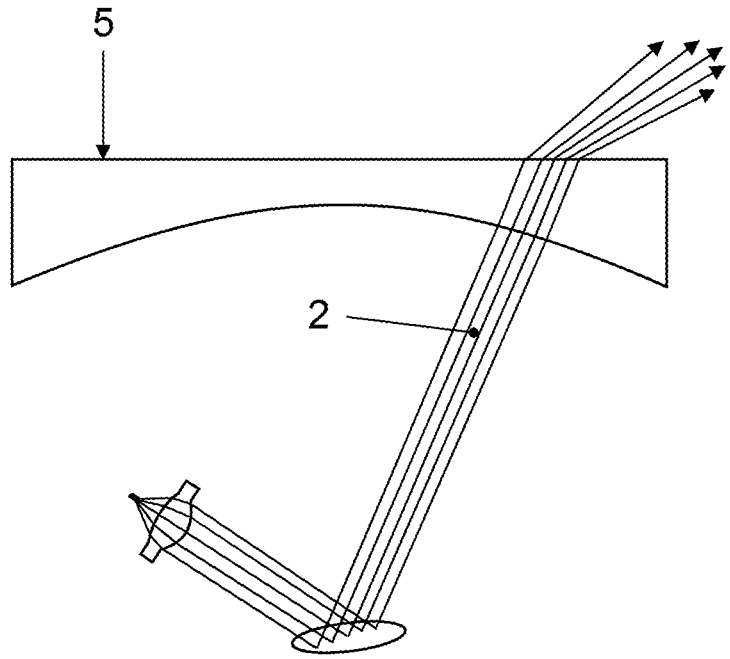
FIG. 6 is a schematic top view of the embodiment in accordance with FIG. 4 where the light exits the device in a second orientation.

In the figures, identical and functionally identical parts have the same reference signs.

The embodiment of a device 10 in accordance with the invention shown in FIG. 1 to FIG. 3 comprises a light source 11 from which light 12 is emitted. The light source 11 can be a laser light source, for example a pulsed infrared laser. In particular, it can be a semiconductor laser. It is quite possible to use a CW laser instead of a pulsed laser. Furthermore, there is the option of using a laser that features an emission wavelength outside the infrared spectral range, for example in the visible range. Furthermore, it is quite possible to provide for more than one laser light source.

There is also the option of using one or more light emitting diodes (LEDs) as a light source.

The device 10 further comprises a primary optic 13, through which the light 12 emitted by the light source 11 passes. In the sample embodiment shown, the primary optic 13 takes the form of a convex lens with a focal distance f, in particular in the form of a biconvex lens (see FIG. 3). It is quite possible to use other primary optics that, for example, have more than one lens. Primary optics in the form of mirrors or comprised of mirrors can also be used.

The exit aperture of the light source 11 merely schematically indicated in FIG. 3 is not located in the focusing plane 14 of the primary optic 13. On the contrary, it features a distance d to the primary optic 13 that is larger than the focal distance f. This brings about a situation where the light 12 emanating from the primary optic 13 is not collimated but is slightly convergent (see FIG. 3).

The device 10 further comprises an oscillating mirror 15 acting as first means of deflection that in particular takes the form of an MEMS mirror with a diameter of the reflecting surface, for example between 1 mm and 5 mm. In particular, the mirror 15 is moved over an angle range of ±15° so that the light 12 reflected by the mirror 15 is deflected into an angle range of around ±30° or into an angle range of around 60°. In doing so, the convergence of the light 12 that can be seen in FIG. 3 remains unchanged.

It is quite possible to use a different first means of deflection.

The device 10 further comprises a secondary optic 16 acting as a secondary means of deflection. The embodiment of the secondary 16 shown features a concave cylindrical entry surface 17 and a flat exit surface 18. This context, the cylindrical axis of the cylindrical lens formed by the cylindrical entry surface 17 extends into the drawing plane of FIG. 1 and FIG. 2 and is thus essentially parallel to the rotary axis (not shown) around which the mirror 15 oscillates.

FIG. 1 shows that the total of the distance d1 from the primary optic 13 to the first means of deflection in the form of a mirror 15 and the distance d2 from the first means of deflection to the second means of deflection in the form of secondary optic 16 is larger than the focal distance f of the primary optic 13. For example, the total of the distances d1+d2 can be larger by a factor or 5 to 50 than the focal distances of the primary optic 13.

Through the design of the curved entry surface 17 and the flat exit surface 18, the secondary optic 16 enlarges the angle range into which the light 12 is deflected. In particular, the size of the angle range can be roughly doubled so that the light 12 is deflected into an angle range of around ±60° or into an angle range of around 120°. FIG. 1 shows a light beam hitting roughly the center of the entry surface 17 and not being deflected. FIG. 2 shows a light bundle hitting an edge area of the entry surface 17 which is then clearly deflected outwards upon exiting the secondary optic 16 in comparison to the direction of incidence.

The secondary optic 16 can in particular be designed such that changes in orientation of the input light bundle a proportionate change in orientation of the output light bundle occurs at least in adjacent contact areas, for example such that the change in orientation on the output side is always roughly double the size of the change in orientation on the input side.

It is quite possible to design the secondary optic in a different way. For example, both the entry surface and the exit surface can be curved, where in particular the curve of the entry surface can be greater than the curve of the exit surface.

Furthermore, there is also the possibility for the secondary optic to comprise mirrors, in particular cylindrical mirrors or to be designed as an optic consisting exclusively of mirrors.

On account of the convergence of the light 12 hitting the secondary optic 16, the light 12 is not widened by the secondary optic 16 to the same extent as in the prior art. It exits the secondary optic to virtually collimated or as a virtually parallel light bundle such that the beam width 19 of individual partial beams 20 of the light is comparatively small in the distant filed (for this, see FIG. 4).

This can be understood in such a way that the bundle of beams emitted by the primary optic 13 has a finite and relevant expansion when it hits the secondary optic 19. If it is assumed that the secondary optic 19 enlarges the deflection angle of every individual beam of the bundle by a constant factor, then the outer beams of the bundle should converge relatively to the center beam of the bundle for reducing the divergence of the exiting light. On account of the constant factor, the inner edge beam is deflected less strongly than the center beam so that is must already feature a preliminary deflection in the orientation of the later overall deflection. Similarly, the outer edge beam is deflected more strongly than the center beam on account of of the constant factor, such that is must already run towards the center beam in order to be subject to a smaller overall deflection at a later point. In this way, the convergence of the light 12 hitting the secondary optic 19 leads to a smaller divergence of the light 12 exiting the secondary optic 19.

A very good object resolution results from a distance measurement device (not shown) provided with the optical device 10 in accordance with the invention. In this context, the device 10 is integrated into the distance measurement device in such a way that, in its installation position in a vehicle, the angle range into which the second means of deflection deflects the light emitted by the first means of deflection is a horizontal angle range.

A distance measurement device of such a kind comprises, in addition to the optical device 10, in particular means of detection that are able to detect light reflected back or scattered back from an object outside of the motor vehicle.

With the embodiment shown in FIG. 1 and FIG. 2, a cylindrical entry surface 17 and a flat exit surface 18 are provided for. The cylindrical axis of the cylindrical entry surface 17 is aligned in such a way that the entry surface exerts an influence on the horizontal orientation of the light.

The is the possibility of providing for a curved exit surface instead of the flat exit surface 18. For example, the exit surface could feature a curve in relation to the orientation extending into the drawing plane of FIG. 1 and FIG. 2. This would make the curve of the exit surface vertical to the curve of the entry surface 17 so that the curved exit surface exerts an influence on the light in a vertical orientation, in particular shaping the light in a vertical orientation.

Furthermore, it is possible for the entry surface 17 to feature not only a curve in the drawing plane of FIG. 1 and FIG. 2 but also, additionally, a curve in the orientation extending into the drawing plane vertical to the former. The entry surface would then no longer be a cylindrical lens but a curved surface, for instance with regard to two orientations. With a design of this kind, the entry surface 17 can exert influence on the light both in a horizontal orientation and in a vertical orientation, in particular forming the light in a vertical orientation.

LIST OF REFERENCE SYMBOLS

1 Light source
2 Primary optic
3 Light exiting the light source
4 Mirror
5 Secondary lens
6 Entry surface of the secondary lens
7 Exit surface of the secondary lens
8 Width of light beam in the distant field
9 Partial light beam in the distant field
10 Device for a distance measurement device according to the LIDAR principle
11 Light source
12 Light exiting the light source
13 Primary optic
14 Focusing plane of the primary optic
15 Mirror
16 Secondary lens
17 Entry surface of the secondary lens
18 Exit surface of the secondary lens
19 Width of light beam in the distant field
20 Partial light beam in the distant field
f Focal distance of the primary optic
d Distance of the exit aperture of the light source to the primary optic
$d_1$ Distance from the primary optic to the mirror
$d_2$ Distance from the mirror to the secondary lens

The invention claimed is:

1. An optical device for a distance measurement device according to the LIDAR principle, the optical device comprising:
   at least one light source for producing a light, wherein the light is divergent when produced;
   a primary optic, wherein during operation of the device, the light is received by the primary optic after being produced by the at least one light source, wherein the light is divergent when it enters the primary optic, and wherein the light is convergent when it exits the primary optic;
   an oscillating mirror, wherein during operation of the device, the convergent light exiting from the primary optic is deflected by the oscillating mirror such that it remains convergent;
   a secondary optic, wherein during operation of the device, the convergent light deflected by the oscillating mirror is convergent when it enters the secondary optic, and wherein the light is either convergent or substantially collimated when it exits the secondary optic.

2. The optical device in accordance with claim 1, wherein the primary optic includes a positive refractive power with a focal distance (f).

3. The optical device in accordance with claim 2, wherein the at least one light source includes an exit aperture at a distance (d) from the focusing plane of the primary optic.

4. The optical device in accordance with claim 1, wherein the oscillating mirror is a MEMS mirror that oscillates around a rotary axis.

5. The optical device in accordance with claim 4, wherein the oscillating mirror includes a reflecting surface with a diameter between 1 mm and 5 mm.

6. The optical device in accordance with claim 4, wherein the secondary optic includes a secondary lens having a first surface where the light enters and having a second surface where the light exits, and wherein the first surface is concave with respect to at least one axis.

7. The optical device in accordance with claim 6, wherein the cylindrical axis of the secondary optic is substantially parallel to the rotary axis of the mirror.

8. The optical device in accordance with claim 2, wherein the total of the distance (d1) from the primary optic to the oscillating mirror and the distance (d2) from the oscillating mirror to the secondary optic is greater than the focal distance (f) of the primary optic by a factor of 5 to 50.

9. A distance measurement device according to the LIDAR principle that is suitable for use in a motor vehicle, the distance measurement device comprising:

an optical device and means of detection that are able to detect light reflected back or scattered back from an object outside the motor vehicle, wherein the optical device is a device in accordance with claim 1.

10. The distance measurement device in accordance with claim 9, wherein the angle range into which the secondary optic deflects the light emitted by the oscillating mirror is a horizontal angle range in the state of the distance measurement device as installed in the motor vehicle.

\* \* \* \* \*